(12) United States Patent
Li

(10) Patent No.: US 11,870,812 B2
(45) Date of Patent: Jan. 9, 2024

(54) CYBERRISK GOVERNANCE SYSTEM AND METHOD TO AUTOMATE CYBERSECURITY DETECTION AND RESOLUTION IN A NETWORK

(71) Applicant: Stanley Yuen Li, Hong Kong (HK)

(72) Inventor: Stanley Yuen Li, Hong Kong (HK)

( * ) Notice: Subject to any disclaimer, the term of this patent is extended or adjusted under 35 U.S.C. 154(b) by 380 days.

(21) Appl. No.: 17/219,841

(22) Filed: Mar. 31, 2021

(65) Prior Publication Data

US 2022/0329630 A1      Oct. 13, 2022

(51) Int. Cl.
*H04L 29/06*       (2006.01)
*H04L 9/40*        (2022.01)
*G06F 16/27*       (2019.01)
*G06N 20/00*       (2019.01)

(52) U.S. Cl.
CPC ............. *H04L 63/20* (2013.01); *G06F 16/27* (2019.01); *G06N 20/00* (2019.01)

(58) Field of Classification Search
CPC ..... A22C 7/0069; A22C 7/0092; A22C 7/003; A22C 7/0076; A22C 7/00; A23P 30/10; B29C 43/3697; B29C 43/40
See application file for complete search history.

(56) References Cited

U.S. PATENT DOCUMENTS

| | | | |
|---|---|---|---|
| 11,081,219 B1* | 8/2021 | Dods | G06N 20/00 |
| 2019/0379642 A1* | 12/2019 | Simons | H04L 63/0414 |
| 2020/0410001 A1* | 12/2020 | Sarkissian | G06F 3/0482 |
| 2021/0157312 A1* | 5/2021 | Cella | G01M 13/045 |
| 2021/0192412 A1* | 6/2021 | Krishnaswamy | G06Q 30/0201 |
| 2022/0108262 A1* | 4/2022 | Cella | G06Q 10/063118 |

* cited by examiner

*Primary Examiner* — Mahfuzur Rahman

(57) ABSTRACT

A cyberrisk governance method to automate cybersecurity detection and resolution in a network is disclosed. The method includes monitoring data related to one or more cybersecurity, Information Technology (IT) operation responses, and governance controls to address regulation, compliance and enterprise risk. Further, the method includes detecting one or more threats in the data using Machine Learning (ML). The one or more threats correspond to at least a malware detection, an intrusion detection, fraud detection for IT, and user behavioral analysis for the internet of things (IoT). The method further includes generating a report for a user based at least on the detected one or more threats. The generated report includes one or more security information and one or more security patches. Thereafter, the method includes sending the generated report to the user, thereby automating cybersecurity detection and resolution in the network.

17 Claims, 11 Drawing Sheets

CYBERRISK GOVERNANCE SYSTEM AND METHOD TO AUTOMATE CYBERSECURITY DETECTION AND RESOLUTION IN A NETWORK

FIELD OF THE DISCLOSURE

The invention relates to cybersecurity, IT management, governance and more particularly related to a cyberrisk governance system and method to automate cybersecurity detection and resolution in a network.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Cyberattacks are becoming one of the most critical problems for businesses throughout the world since the majority of businesses have the internet as a basic platform to store information and data. Therefore, developing and maintaining the cybersecurity to counter the cyberattacks is a need for all the business throughout the world. In the cybersecurity industry, measures are put in place to defend an enterprise against threats to technological infrastructure which is commonly referred to as Cybersecurity Risk Management (CRM). The Cybersecurity Risk Management deals with protecting technologies such as information security, computer networks, programs, and data, that falls under Information Technology (IT). However, there are critical differences between the IT and the cybersecurity, and it is practically necessary to consider the two as separate functions.

A business that uses computer systems and programs to process data needs IT to generate revenue. For example, considering a grocery store, how would it function without the computer system used to ring up items for purchase, or if they did not have the software needed to process credit card transactions? Therefore, the grocery store requires technology to operate, so IT is categorized under "Revenue Generation" i.e. revenue cannot be generated without solutions. However, cybersecurity, on the other hand, is not technically necessary for a business to generate revenue and a grocery store can operate without any cybersecurity measures in place. However, considering a scenario of a grocery store's credit card processor being hacked and customer information is compromised, then a data breach of such magnitude can have a devastating impact on the grocery store's ability to run the business and make money. Therefore, the cybersecurity is categorized under, "Revenue Impact" i.e. revenue generation is affected for a predefined but acceptable period. Further, the IT and the cybersecurity may also be categorized under efficiency generation i.e. support and governance relates to revenue generation and decreases human capital expenditure, and efficiency impact i.e. impacting support and governance but is not critical to revenue generation. Therefore, the major difference between IT and cybersecurity is how they relate to revenue. While cybersecurity and IT are inherently different, they are still in close relation to each other since, if there was no technology to protect, cybersecurity would not exist. Therefore, Computing Community Consortium (CCC) expresses Information and Communications Technology (ICT) as having a central role in modern society and, malicious hackers and cybercrime as a stubborn and expensive part of the ICT landscape.

However, developing and maintaining cybersecurity is an expensive asset and only large enterprises can develop a well-established cybersecurity staff to look after the information technology (IT) systems and the cyberattacks. However, the majority of businesses around the world are small and medium enterprises (SMEs) with fewer than 50 employees that cannot afford dedicated cybersecurity to look after the IT systems and the cyberattacks leading to vulnerability of confidential and important data. Typically, the SMEs outsource the IT works to third parties i.e. IT contractor companies to look after the IT system and develop security against cyberattacks. Another problem in cybersecurity & IT operations is the global shortage of cybersecurity professionals and inefficiencies between cybersecurity & IT operations team to reduce risk. According to the 2020 Allianz Risk Barometer survey, cybersecurity has emerged as a leading risk for businesses in Asia-Pacific and around the world. Further, according to the Hong Kong productivity council (HKCERT), cyberattacks arising from the use of new technologies such as Artificial Intelligence (AI), Internet of Things (IoT), and 5G communications have recorded significant hikes in botnet and phishing websites reports in Hong Kong in 2019. Further, as per the Frost & Sullivan study commissioned by Microsoft, potential economic losses in Hong Kong because of cybersecurity attacks may hit a whopping US$32 billion (HKS249.6 billion) annually.

Further, the relationship between the IT and the cybersecurity is further complicated when the impact is being introduced by human factors. Therefore, in a project led by Scott L. David titled, Atlas of Information Risk Maps, hybrid groups of entities, such as humans, entities and things, that are coupled together by information networks are appropriately labelled and analyzed comprehensively as a 'socio-technical system'. The socio-technical systems exist wherever humans, or entities run by humans, intersect with technology and encompasses most businesses operating in the modern world especially the businesses whose revenue is necessarily generated by technology. However, it is important to understand that cybersecurity and IT are separate, it is equally important to understand a business as a socio-technical system. Therefore, when approaching cybersecurity, a business should avoid isolating the cybersecurity as simply an IT problem, and instead consider all ways through which the cybersecurity affects different facets of the business. Further, the project also describes the requirement of new metrics for system organized and operation that is not just "technical" (i.e. data-focused) but is also "socio-technical" (i.e., information focused) to address the exponentially increasing threats and vulnerabilities taking place on the Internet's interaction landscapes. Further, when a business understands how cybersecurity is involved in every facet of their business, it requires a new way of addressing the problem.

Additionally, the project also describes exploring the new era of cybersecurity governance through organization and user's assets including connected computing devices, personnel, infrastructure, applications, services, telecommunications systems, and the totality of transmitted and/or stored information in the cyber environment. Further, according to the CCC, the socio-technical system requires a more advanced cybersecurity strategy that recognizes that the science and technology deployed to protect and defend the information and critical infrastructure must consider human, social, organizational, economic and technical factors, as well as the complex interaction among them, in the creation, maintenance, and operation of our systems and infrastructure.

Further, 60% of security breaches in 2019 involved unpatched vulnerabilities and although automated patch management solutions are available, it is noted that 76% lack a common view of applications and assets across security and IT teams. Also, it should be noted that 49% of the cyberattacks arise from system vulnerabilities and human errors. Additionally, all the available solutions require significant end-user efforts. Further, the available solutions fail to notify the user with a security alert related to suspicious network behavior about a new or outstanding security threat and provide a resolution method in terms of threat security level.

Further, the cybersecurity impacts a business at different levels along the supply chain. Further, when enterprise departments address cyberrisk aspects independently (i.e., governance compliance, technologists, and business executives), it is difficult to holistically address the enterprise cyberrisk weak points. Thus, these gaps in communication between departments and lack of awareness of the bigger picture of cybersecurity might leave the businesses vulnerable to cybersecurity threats.

Further, due to the global cybersecurity & IT management skill shortage, and lack of company commitment to protect consumer data, the government, regulators, and industry authority continue to develop Governance, Risk, Compliance (GRC) frameworks. The GRC frameworks demand companies to have management practices to protect personally identifiable data, sensitive data such as credit card information and transactions record such as shipping manifesto, healthcare & patient records, supply chain risk management, etc. For example, General Data Protection Regulation (GDPR) is used to protect European Union consumer data and applies to all global companies having the obligation to comply when they have the European consumer data in their network.

Also, available solutions fail to express the exponentially increasing threats and vulnerabilities taking place on the Internet's interaction landscapes. Therefore, there is a need for an improved system and method to manage the cyberrisk, including governance process, and for providing autonomous cybersecurity in a network for overcoming the abovementioned drawbacks and auditing capabilities to prevent and recover any company data.

SUMMARY OF THE INVENTION

According to embodiments illustrated herein, a cyberrisk governance method to automate cybersecurity detection and resolution in a network is disclosed. The method includes monitoring data related to one or more cybersecurity, Information Technology (IT) operation responses, and governance controls to address regulation, compliance, and enterprise risk. Further, the method includes detecting one or more threats such as security incidents & threat intelligence, with the metadata, correlating with human capital for company objective interpretation and prioritization (augmented intelligence), using Machine Learning (ML) to learn from three aspects, such as, but not limited to cybersecurity, IT, and governance of input to automate the resolution with the correlated & contextualized data. The one or more threats may correspond to at least a malware detection, an intrusion detection, identified vulnerabilities such as common value expose (CVE), zero-day exploitations, system administration threats such as firewall configuration discrepancies and threat intelligence with paid or open-source.

Further, the data may be correlated as "correlated data" with a scoring risk in the network for operational technology (OT), prioritization from detection to resolution for IT, with the user and network behavioral analysis to address the "signatureless" risk. It can be noted that the correlated data may be a combination of technology tools integrated into a single platform solution for the user to deploy for detecting security incidents and governance gap. Further, the correlated data may be a series of algorithms based on third-party technology tools to generate the structure and unstructured data from network metadata, devices log, and events for detecting security incidents and governance gap. It can also be noted that after data extraction integration and meeting business requirements process with third-party solution providers, ecosystem (PEACEcosystem), may generate the correlated data as part of the ML algorithm. Further, paid, Open-Source, and self-generated treat intelligence may be part of the ML algorithm, governance controls with input from business executives, compliance managers, internal & external auditors, the OT from daily activities with industry-recognized benchmarks, and technical controls assessment result.

The correlated data may further combine with the augmented intelligence, which is an input via the consolidated risk indicator dashboard (Unity), for the ML (iA—InterOps Accelerator as our SecOps Automation Engine) to produce remediation recommendations to resolve the security risk. Further, the produced remediation recommendations may be automatically deployed into technology tools such as the firewall and desktop to resolve the identified vulnerabilities or recommended fixes from solution providers or the community users. Further, the OT operator may be based on an open-source and ecosystem solution provider, such as community users that may recommend to automated the fixes based on the validated "Trust Score." Further, the automation deployment process may be documented with a control management process within the dashboard, for auditing and training to the operator and ML algorithm to enhance the accuracy of the ML. The method further includes generating a report, for a user, based at least on the detected one or more threats. The generated report includes one or more security information and one or more security patches. Thereafter, the method includes sending the generated report to the user and thereby automating cybersecurity detection and resolution in the network.

In one exemplary embodiment, the cyberrisk governance method to automate cybersecurity detection and resolution in a network further comprises receiving an input corresponding to a selection of a security patch from the one or more security patches, from the user. Thereafter, the method comprises executing the selected security patch in the network to eliminate one or more threats.

In one exemplary embodiment, the cyberrisk governance method to automate cybersecurity detection and resolution in a network further comprises consolidating the data and storing the consolidated data in a database.

According to embodiments illustrated herein, a cyberrisk governance system to automate cybersecurity detection and resolution in a network is disclosed. The system comprises a security data management module configured to monitor data related to one or more cybersecurity, Information Technology (IT) operation responses, and governance controls to address regulation, compliance, and enterprise risk.

The system further comprises an artificial threat detection and report generator module configured to detect one or more threats such as security incidents & threat intelligence, with the metadata, correlating with human capital for company objective interpretation & prioritization (augmented intelligence), using Machine Learning (ML) to learn from three aspects, such as but not limited to cybersecurity, IT, and governance of input to automate the resolution with the correlated & contextualized data. The one or more threats may correspond to at least a malware detection, an intrusion detection, identified vulnerabilities such as common value expose (CVE), zero-day exploitations, system administration threats such as firewall configuration discrepancies and threat intelligence with paid or open-source.

Further, the data may be correlated as "correlated data" with a scoring risk in the network for operational technology (OT), fraud detection for IT, with the user behavioral analysis to address the "signatureless" risk. It can be noted that the correlated data may be a combination of technology tool integrated into a single platform solution for user to deploy for detecting security incidents and governance gap. Further, the correlated data may be a series of algorithms based on third-party technology tools to generate the structure and unstructured data from network metadata, devices log, and events for detecting security incidents and governance gap. It can also be noted that after data extraction integration and meeting business requirements process with third-party solution providers, the ecosystem (PEACEcosystem), may generate the correlated data as part of the ML algorithm. It should be noted that the correlated data may be a combination of technology tool integrated into a single platform solution such as a blockchain technology (Distributed Ledger Technology (DLT)) to increase security and controls of correlated data by the user to deploy for automatically detecting security. Further, paid, Open-Source, and self-generated treat intelligence may be part of the ML algorithm, governance controls with input from business executives, compliance managers, internal & external auditors, the OT from daily activities with industry-recognized benchmarks, and technical controls assessment result.

The correlated data may combine with augmented intelligence, which is an input via the consolidated risk indicator dashboard, for the ML to produce remediation recommendations to resolve the security risk. Further, the produced remediation recommendations may be automatically deployed into technology tools such as the firewall and desktop to resolve the identified vulnerabilities or recommended fixes from solution providers or the community users. Further, the OT operator may be based on an open-source and ecosystem solution provider, such as community users that may recommend to automated the fixes based on the validated "Trust Score." Further, the automation deployment process may be documented with a control management process within the dashboard, for auditing and training to the operator and ML algorithm to enhance the accuracy of the ML. Further, the system comprises a user portal and control management module configured to generate a report for a user based at least on the detected one or more threats, wherein the generated report includes one or more security information and one or more security patches. Further, the user portal and control management module is configured to send the report to the user and thereby providing the autonomous cybersecurity in the network, thereby providing autonomous cybersecurity in the network.

In one exemplary embodiment, the cyberrisk governance system to automate cybersecurity detection and resolution in a network is further configured to receive an input corresponding to a selection of a security patch from the one or more security patches, from the user. Thereafter, the system is configured to execute the selected security patch in the network to eliminate one or more threats.

According to embodiments illustrated herein, a non-transitory computer program product to automate cybersecurity detection and resolution in a network is disclosed. The computer program product includes monitoring data related to one or more cybersecurity, Information Technology (IT) operation responses, and governance controls to address regulation, compliance, and enterprise risk. Further, the computer program product includes detecting one or more threats such as security incidents & threat intelligence, with the metadata, correlating with human capital for company objective interpretation & prioritization (augmented intelligence), using Machine Learning (ML) to learn from three aspects, such as but not limited to cybersecurity, IT, and governance of input to automate the resolution with the correlated & contextualized data. The one or more threats corresponds to at least a malware detection, an intrusion detection such as common value expose (CVE), zero-day exploitations, system administration threats such as firewall configuration discrepancies and threat intelligence with paid or open-source.

Further, the data may be correlated as "correlated data" with a scoring risk in the network for operational technology (OT), prioritization from detection to resolution for IT, with the user and network behavioral analysis to address the "signatureless" risk. It can be noted that the correlated data may be a combination of technology tool integrated into a single platform solution for user to deploy for detecting security incidents and governance gap. Further, the correlated data may be a series of algorithms based on third-party technology tools to generate the structure and unstructured data from network metadata, devices log, and events for detecting security incidents and governance gap. It can also be noted that after data extraction integration and meeting business requirements process with third-party solution providers, the ecosystem (PEACEcosystem), may generate the correlated data as part of the ML algorithm. Further, paid, Open-Source, and self-generated treat intelligence may be part of the ML algorithm, governance controls with input from business executives, compliance managers, internal & external auditors, the OT from daily activities with industry-recognized benchmarks, and technical controls assessment result.

The correlated data may combine with augmented intelligence working as an input via the consolidated risk indicator dashboard, for the ML to produce remediation recommendations to resolve the security risk. Further, the produced remediation recommendations may be automatically deployed into technology tools such as the firewall and desktop to resolve the identified vulnerabilities or recommended fixes from solution providers or the community users. Further, the OT operator may be based on an open-source and ecosystem solution provider, such as community users that may recommend to automated the fixes based on the validated "Trust Score." Further, the automation deployment process may be documented with a control management process within the dashboard, for auditing and training to the operator and ML algorithm to enhance the accuracy of the ML. The computer program product further includes generating a report for a user based at least on the detected one or more threats. The generated report includes one or more security information and one or more security patches. Thereafter, the computer program product includes sending the generated report to the user. Thereby, thereby providing autonomous cybersecurity in the network.

In one exemplary embodiment, the computer program product to automate cybersecurity detection and resolution in a network further comprises the program code to receive an input corresponding to a selection of a security patch from the one or more security patches, from the user. Further, the computer program product comprises the program code to execute the selected security patch in the network to eliminate the one or more threats.

In one exemplary embodiment, the computer program product to automate cybersecurity detection and resolution in a network further comprises the program code to consolidate the data and store the consolidated data in the database.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
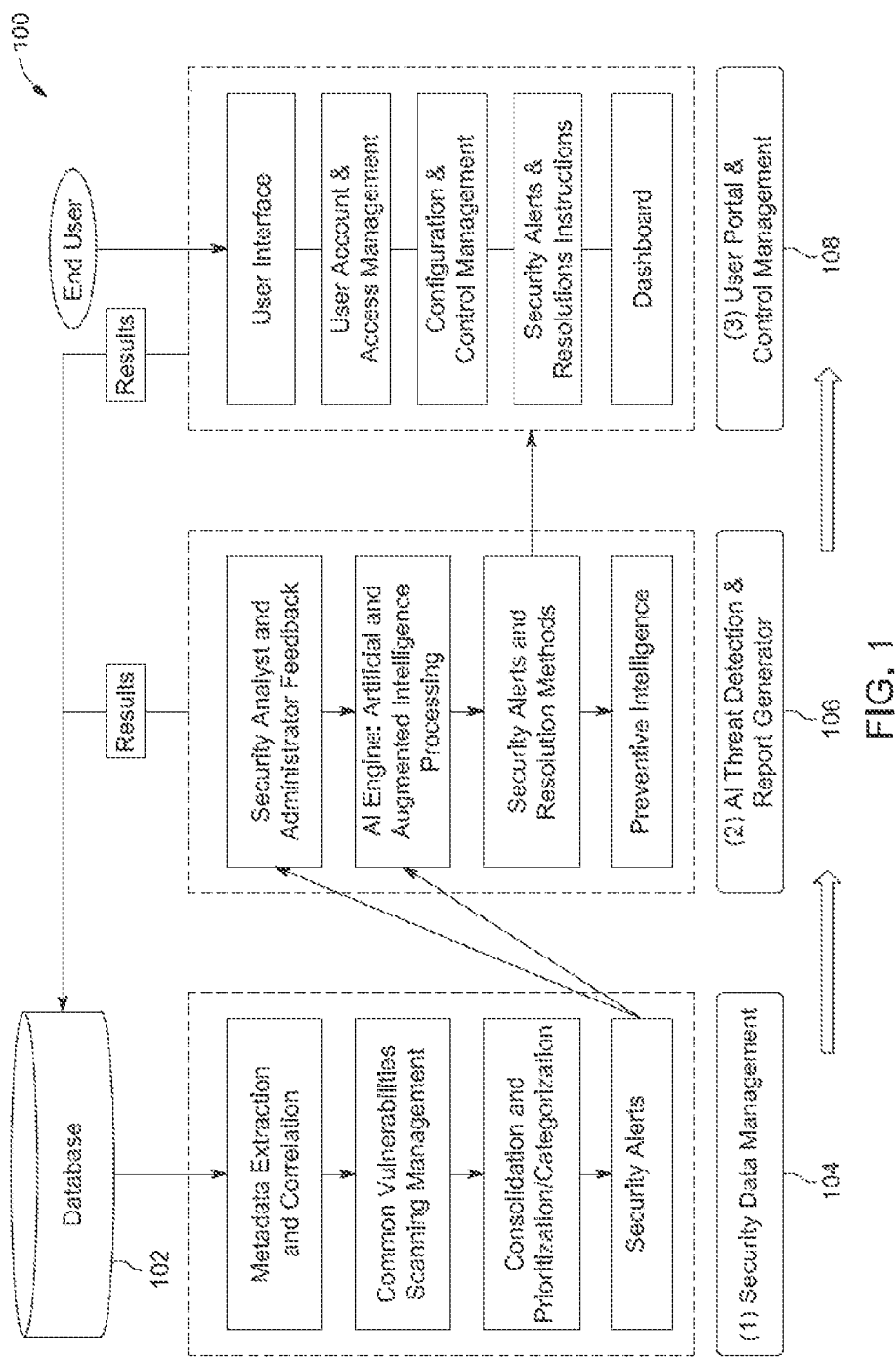
FIG. 1 illustrates a block diagram of a cyberrisk governance system 100 to automate cybersecurity detection and resolution in a network, according to an embodiment of the present disclosure.

FIG. 1 illustrates a block diagram of a cyberrisk governance system 100 to automate cybersecurity detection and resolution in a network, according to an embodiment of the present disclosure. It should be noted that the cyberrisk refers to any risk of financial loss, disruption or damage to the reputation of an organization resulting from the failure of its information technology systems. It should also be noted that the governance refers to structures and processes that are designed to ensure accountability, transparency, responsiveness, rule of law, stability, equity and inclusiveness, empowerment, and broad-based participation.

Figure 2:
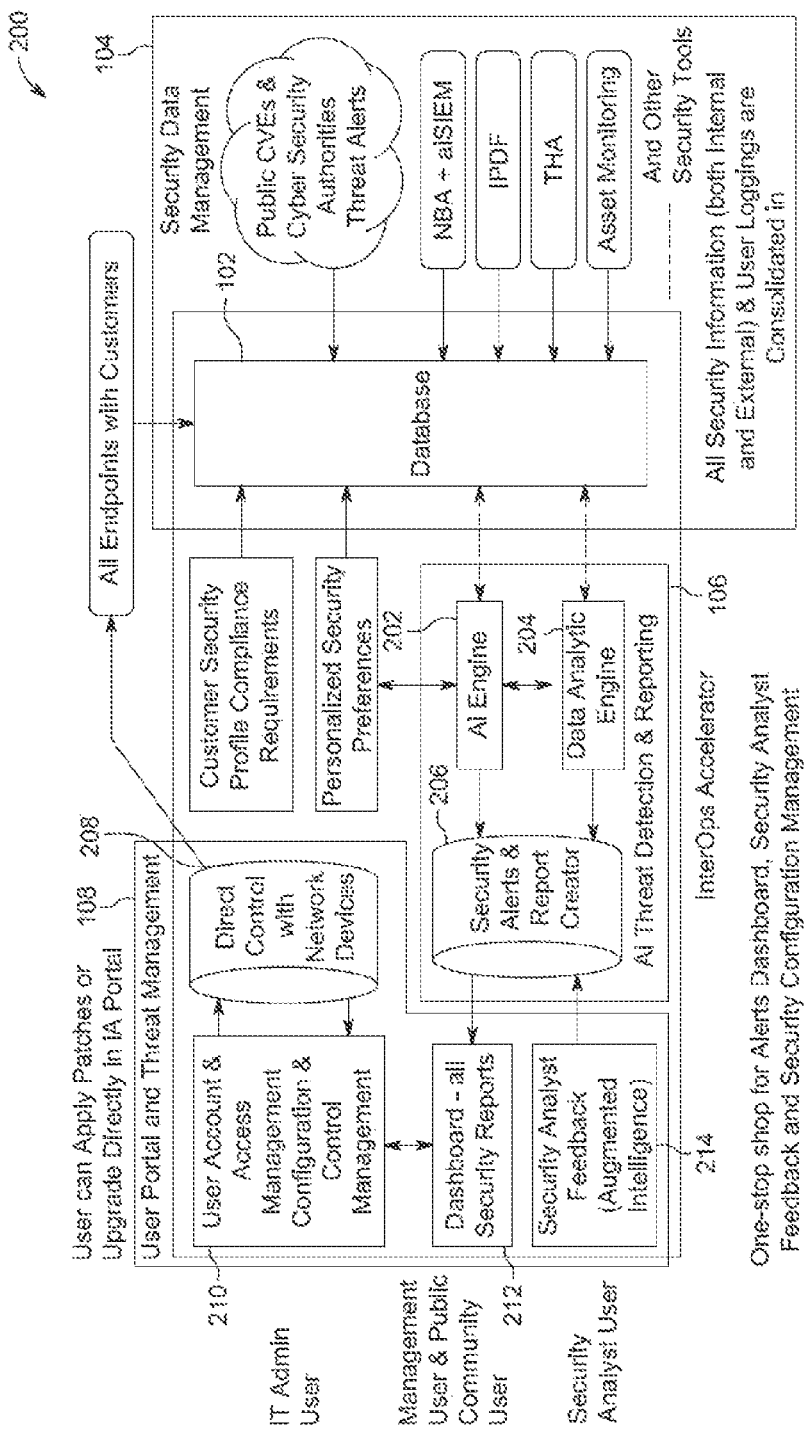
FIG. 2 illustrates a logical architecture 200 of the cyberrisk governance system 100 to automate cybersecurity detection and resolution in a network, according to an embodiment of the present disclosure.

The system 100 may comprise a database 102, a security data management module 104, an Artificial Intelligence (AI) threat detection and report generator module 106, and a user portal and control management module 108. In one embodiment, the system 100 may be an InterOps Accelerator and the database 102 may be a data-driven security data lake. In another case, the system 100 may be unity coupled to an ecosystem such as PEACEcosystem in a SecOps environment. FIG. 1 may be described in conjunction with FIG. 2, showing a logical architecture 200 of the cyberrisk governance system 100 to automate cybersecurity detection and resolution in a network, according to an embodiment of the present disclosure.

The database 102 may include user data in a consolidated form. In one embodiment, the user data may be unstructured and structured. It should be noted that the unstructured data may be determined by a data scientist for forensic and threat hunting enhancements. In one embodiment, the user data may be pre-processed and cleaned using a chain of steps including, but are not limited to, making text lower case, removing punctuation, removing numerical values, removing common non-sensical text, tokenizing text, and removing stop words. It should be noted that the user data may additionally be cleaned by stemming/lemmatization and creating bi-grams or tri-grams, without departing from the scope of the invention. In one case, the data may include public Common Vulnerabilities and Exposures (CVEs) information. In another case, the data may include, but is not limited to, all user device information i.e. user security profile, security patches, historical data, security level, executive management with company objectives & governance controls priorities, GRC user responsibilities and their responses for data correlation to adjust the risk scoring functionality, user activities logs collected from Network Behaviors Analytic Tools (NBA) with severity level based on the tools' scoring function, automated penetration testing tools (i.e. Penetration Testing Unlimited—PTU) with identified risk for further opportunity of exploitation, and Security Information and Event Management Tools (SIEM) with its capabilities to learn from augmented intelligence to reduce "False Positives". In yet another case, the data may include Continuous Vulnerabilities Scanning Management (CVAM) that includes all the system details with the identified vulnerabilities and related score (CVSS—Common Vulnerability Scoring System) and severity level of the identified vulnerabilities. In yet another case, the data may include all external and internal data access records that are stored with the Integrated Prevention and Defense Firewall (IPDF) and with the DNS activities, blocking potential risky IP Address, domain names, URL, with non-business related geolocation with traffic for coming into the network and leaving the network. Further, the data stored in the database 102, may be integrated and classified into GraphQL using Blockchain technology (Distributed Ledger Technology—DLT). Additionally, the database 102 may provide an additional layer of security with tokenization for users to control the metadata and inputted data. In one embodiment, a web 3.0 (i.e. a Semantic Architecture) with a Blockchain Database may reside in a Blockchain Data Lake distributing the database in regional data centers to satisfy data sovereignty and related regulatory compliance. Further, the Blockchain Database may place "tokens" with the sensitive data, that may be mapped to associate with each community or paid user in leveraging a tokenization solution. Further, the tokens may be rendered to be unusable without a tokenization system and may improve the security of the transactions, and provide control to the users with the data.

In one embodiment, the database 102 may provide secure and direct data access to third parties with no need for custom "discovery" layers or access logic spread across APIs. Additionally, data stakeholders may directly search for the data with SPARQL, FlureeQL, or GraphQL. Further, the data in the database 102 may be time-stamped and traceable, by extending a Resource Description Framework (RDF) to include temporal metadata. Additionally, a "time travel" aspect may be used to issue a query against any moment of time and instantly retrieve the data as of that instance. Further, the database 102 may have a data-centric approach and may include a data layer with a program file-grained security logic executed at the data layer with smart functions to allow data to "defend itself" across domains. Additionally, the data-centric approach may collapse potential attack surfaces and may save time in managing identity/access across the enterprise. Further, the data in the database 102 may be formatted in World Wide Web Consortium (W3C)-standard RDF and exposes the information as a rich "semantic" graph database making the data Findable, Accessible, Interoperable, and Reusable (FAIR). Further, the data in the database 102 may be secured with unbreakable blockchain cryptography for extreme data integrity. Additionally, the data in the database 102 may be optionally decentralized allowing democratic control across data-network governed by industry consortia.

The security data management module 104 may be configured to extract the data from the database 102. Further, the security data management module 104 may correlate the data. It should be noted that the correlated data may be a combination of technology tool integrated into a single platform solution for the user to deploy a series of algorithms based on third-party technology tools to generate the structure and unstructured data from network metadata, devices log, and events for detecting security incidents and governance gap. Further, the security data management module 104 may determine common vulnerabilities in the data extracted from the database 102. Additionally, the security data management module 104 may consolidate the data by prioritizing and categorizing the data extracted from the database 102. Successively, the security data management module 104 may determine one or more security alerts from the consolidated data. Thereafter, the security data management module 104 may send the determined one or more security alerts to the AI threat detection and report generator module 106.

It should be noted that the system 100 may increase the efficiency of cybersecurity & IT operations with AI to predict a company's enterprise risk, based on their current environment and governance requirements like regulatory & compliance frameworks, without departing from the scope of the disclosure.

The AI threat detection and report generator module 106 may comprise an AI engine 202 configured to receive the one or more security alerts from the security data management module 104. Further, the AI engine 202 may also receive user device information i.e. user security profile, security patches, historical data, security level, user activity logs, security information, or Common Vulnerabilities and Exposure (CVE) information. It should be noted that the AI engine 202 may determine one or more resolution methods corresponding to the one or more security alerts based at least on the received the user security profile, the user compliance requirements, and the user personalized security preferences. In one case, the AI engine 202 may utilize concepts of Machine Learning (ML). In another case, the AI engine 202 may utilize the concepts of Preventive Intelligence (PI). Further, the AI engine 202 may be trained using labels for each training data from Security Information and Event Management (SIEM) and other IDS. In one case, the labels may be created by a heuristic provided by a security analyst. In order to train the AI engine 202, the security analyst will review the result and gives feedback and the process may be iterated multiple times until the security analyst approves the results. Additionally, to prevent outfit, dropout may be used such that each neuron having a probability of 1-p may be ignored. In one embodiment, the AI engine 202 may include a malware software to detect the traffic patterns and report for all suspicious network activities that a security analyst may provide inputs to improve the detection with Machine Learning (ML).

It should be noted that the AI may have the capability to focus on the tool's objective such as, but not limited to, SIEM has its own AI to reduce False Positive trained by SecOps administrators. It should be noted that the AI may learn from bus exec. GRC manager, SecOps manager & administrator, and community users based on their response interaction via Unity to a security incident based on the metadata, such as but not limited to geolocation, device types, application types & version, and destination IP address.

In one exemplary embodiment, a user is required to comply with the General Data Protection Regulation (GDPR) in Hong Kong. However, the SIEM may identify an incident (alert) that an end-user computer has a malware activity when serving a website with an IP address of Russia. Since the user doesn't have any business relationship in Russia (determined by a Bus Exec) and the company has GDPR compliance. This would trigger a higher severity priority with a higher score. The SecOps Management team may see this is a high score with High Compliance Priority. As a result, SecOps Administrator is assigned to remediate the incident immediately. The SecOps Admin may put a "Block" to that website that may be associated with Russia. Further, the iA may learn that Russia is a potential risk to the business, and all further Russia network traffic shall be blocked. Further, the report may show the existence of high severity alert to all stakeholders in real-time, the stakeholders may respond based on a chain of events including a user's login for compliance trail, learning how to block traffic associated with Russia, and show regulators for a forensic reason for the authorization process. Additionally, the report may also include how traffic associated with Russia is affecting the risk score of the organization for cyber insurance annual premium adjustment and reimbursement in the case of the data breach. In one case, the data and scoring may be used for cyber insurance companies as a risk evaluation to each insured user with their cyberrisk governance posture.

Further, the AI threat detection and report generator module 106 may comprise a data analytic engine 204 that may be communicatively connected to the AI engine 202 for sending and receiving the data. The data analytic engine 204 may continuously monitor a user behavior pattern and report to the AI engine 202 any unusual or non-legitimate user behavior. Further, the AI threat detection and report generator module 106 may comprise security alerts and reports creator module 206 communicatively connected to the AI engine 202 and the data analytic engine 204 to receive the one or more security alerts. In one embodiment, the security alerts and reports creator module 206 may receive feedback from the user portal and control management module 108. In one embodiment, the AI threat detection and report generator module 106 may be configured to store the one or more security alerts along with the one or more resolution methods in the database 102.

Further, the security alerts and reports creator module 206 may send the one or more security alerts along with the one or more resolution methods to the user portal and control management module 108. It can be noted that the security alerts and reports creator module 206 may also include how traffic associated with one or more security alerts is affecting the risk score of the organization for cyber insurance annual premium adjustment and reimbursement in the case of a data breach. In one case, the data and scoring may be used for cyber insurance companies as a risk evaluation to each insured user with their cyberrisk governance posture. Additionally, the security alerts and reports creator module 206 may be configured to receive one or more security analyst feedback through Augmented Intelligence (AI). Further, the ML may be trained based on one or more feedbacks and historical data of the network.

The user portal and control management module 108 may include a user interface that is configured to establish direct control with a network device, as shown by 208. Further, the user interface may facilitate a user to access and manage the user account, as shown by 210. In one embodiment, the user interface may include a dashboard to view various security information, as shown by 212. In one case, the dashboard may be a consolidated risk indicator dashboard. The security information may include but is not limited to, security alerts for malicious attacks, security alerts for CVE and cybersecurity authorities, and patches updates suggestion with reference to designated user execution. Further, the user interface may facilitate the end-user to send one or more security analyst's feedback to the security alerts and reports creator module 206, as shown by 214. In order to receive the feedback, the user portal and control management module 108 may configure and control the security alerts and the one or more resolution methods. It should be noted that the user interface may include another dashboard to allow the user to select various options related to the user account, security alerts, and resolution methods. In one embodiment, the user portal and control management module 108 may be configured to store the selected options related to the user account, security alerts, and the resolution methods in the database 102. Further, the user portal and control management module 108 may be explained in conjunction with FIG. 3.

Figure 3:
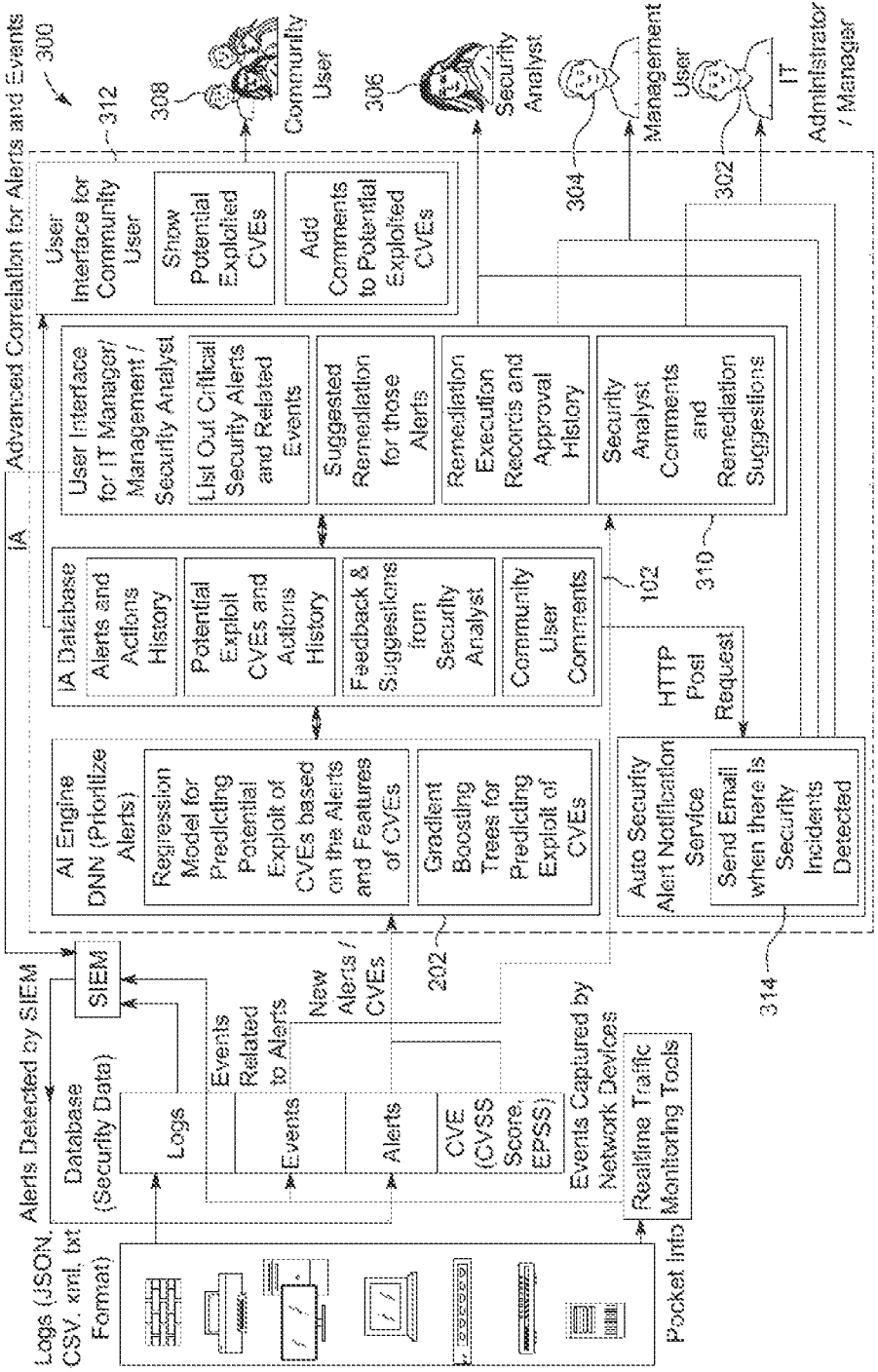
FIG. 3 illustrates a detailed logical architecture 300 of the cyberrisk governance system 100 to automate cybersecurity detection and resolution in a network, according to an embodiment of the present disclosure.

FIG. 3 illustrates a detailed logical architecture 300 of the cyberrisk governance system 100 to automate cybersecurity detection and resolution in a network, according to an embodiment of the present disclosure.

The user portal and control management module 108 may be configured to provide security alerts and/or receive feedback from one or more users including, but are not limited to, an IT administrator 302, a management user 304, a security analyst 306, GRC (Governance, Risk, Compliance) managers, and a community user 308 through IT administrator flow, a management user flow, a security analyst flow, and a community user flow, respectively. It should be noted that the system may handle issues with IT, cybersecurity, and governance separately and understand that the three are interconnected, and apply a holistic approach. Further, the user portal and control management module 108 may include a common user interface, as shown by 310, for the IT administrator 302, the management user 304, and the security analyst 306. The common user interface 310 may display, but is not limited to, critical security alerts and related events, suggested remediation for the alerts, executed remediation, record and approval history, and security analyst comments remediation suggestions. Further, the user portal and control management module 108 may include a user interface for the community user 308, as shown by 312. The common user interface 310 may display potential exploited CVEs and comments to potential exploited CVEs. In one additional embodiment, the user portal and control management module 108 may also include an auto security alert notification to send an email when a security incident is detected, as shown by 314.

In one embodiment, the ML method may use common remediation strategies among the CVSS scores or published exploits. CVSS scores may be used to prioritize vulnerabilities to be fixed. CVSS may be defined as a free and open industry-standard framework for retrieving the severity of vulnerabilities. On the other hand, the ML method may prioritize based on vulnerabilities with publicly available exploit code, which may be achieved by augmenting CVSS with vulnerabilities on published exploits score. It can be noted that the use of published exploits may reduce the CVEs to be fixed with a reduced tradeoff of security.

In one exemplary embodiment, the user portal and control management module 108 may allow each stakeholder to input criteria for the ML to learn a user's input pattern to trigger suggested remediation options. It should be noted that as the system learns more input criteria, the higher accuracy of the options may be provided and the process may be completely automated until criteria, such as company objective, regulatory requirement, or technology solution changes.

In one embodiment, the ecosystem may be integrated with technologies such as STEM, NBA, Penetration Testing tools, and other technology tools/solutions (such as Extended detection and response-XDR, XDR is cross-layered detection and response). XDR collects and automatically correlates data across multiple security layers such as email, endpoint, server, cloud workloads, and network. These facilitate to detect the threats faster and improve the investigation and response times of security analysts. Such a solution identifies CVE (or signature attacks) and it can detect and notify signatureless (zero-days attacks), and Risk Trending Analysis against other company in the same segment of the industry, size of users, type of network, devices, geolocation, etc. to provide PI to alert your company if there is a specific type attack will affect your risk score, to take preventive measures. Further, the PI may alert paid users and community users (with delay), they can leverage the PI to reprioritize their task assignment in the Control Management system and contribute their inputs back to AI for higher accuracy.

Figure 4:
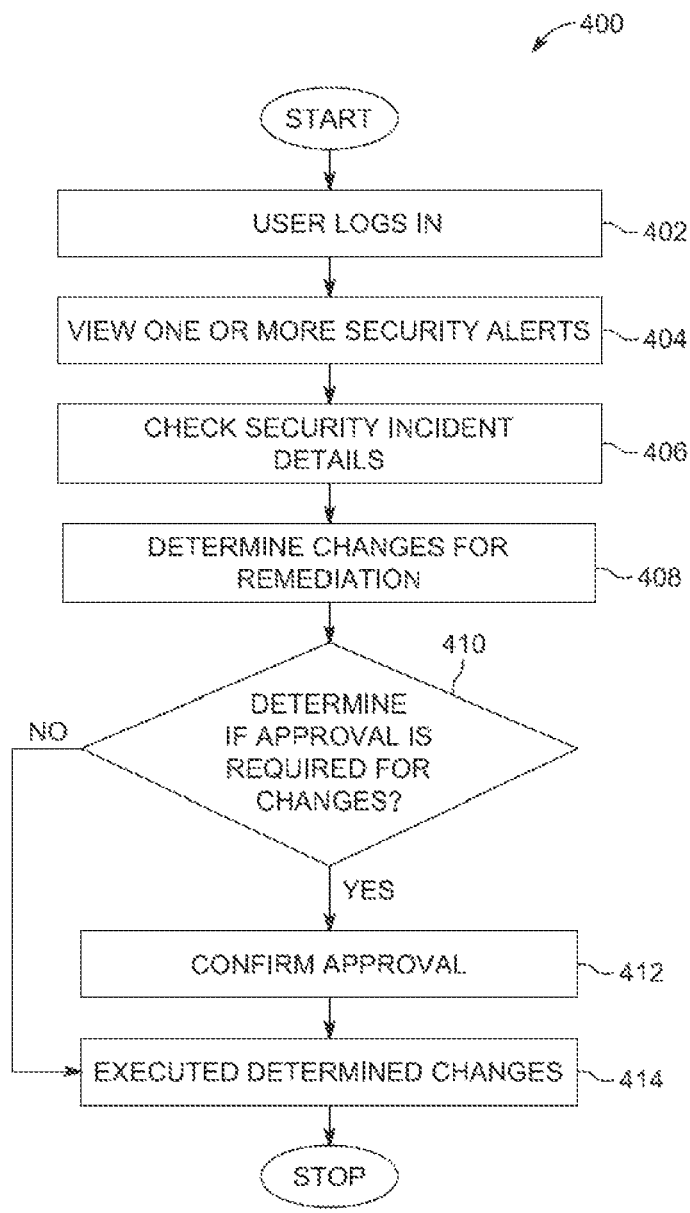
FIG. 4 illustrates a flow chart 400 showing an IT administrator flow, according to an embodiment of the present disclosure.

In one embodiment, the IT administrator flow may be explained in conjunction with a flow chart 400 shown in FIG. 4. It should be noted that the IT administrator (technology team) may manage risk and compliance within the IT department and the IT administrator may become an enabler for enterprise risk management by leveraging technology to proactively monitor and manage broader business risks and compliance. At first, the user may log in to the user portal and control management module 108, at step 402. In one embodiment, the user may correspond to an IT administrator 302, the IT administrator 302 may be configured to view all the security updates/alerts on the user interface. In another embodiment, the user may correspond to an IT manager. Upon successful login, the user may view one or more security alerts, at step 404. The one or more security alerts may include, but is limited to, security alerts with severity levels, public CVE and community warnings. In one example embodiment, the security alerts may be Microsoft Windows 10 with Cisco's ASA firewall working in a geographic region with a recent influx of cyberattacks. Consequently, the user may check security incident details, at step 406. The security incident details may include but are not limited to, affected device, a user ID associated with the affected device, detected threat, time and other information. Further, based on the checking of security incident details, the user may determine changes for remediation, at step 408. Upon successful determination of changes for the remediation, the user may determine if an approval is required for determining changes, at step 410. In one case, if the approval is required, then the user may confirm the approval at step 412 and execute the determined changes, at step 414. In another case, if the approval is not required, then the user may move to step 414 to execute the determined changes. It should be noted that the changes may be learnt from the AI based on the user's login credential and user's role in the cyberrisk governance system, the credential may determine a percentage of the decision score with the inputs, that may be modified based on the company's objective with business executive focus, GRC Manager focus, or SecOps Team focus. The GRC Manager focus may affect the AI's output recommendation options along with the severity level of the security incident, and governance controls priority.

Figure 5:
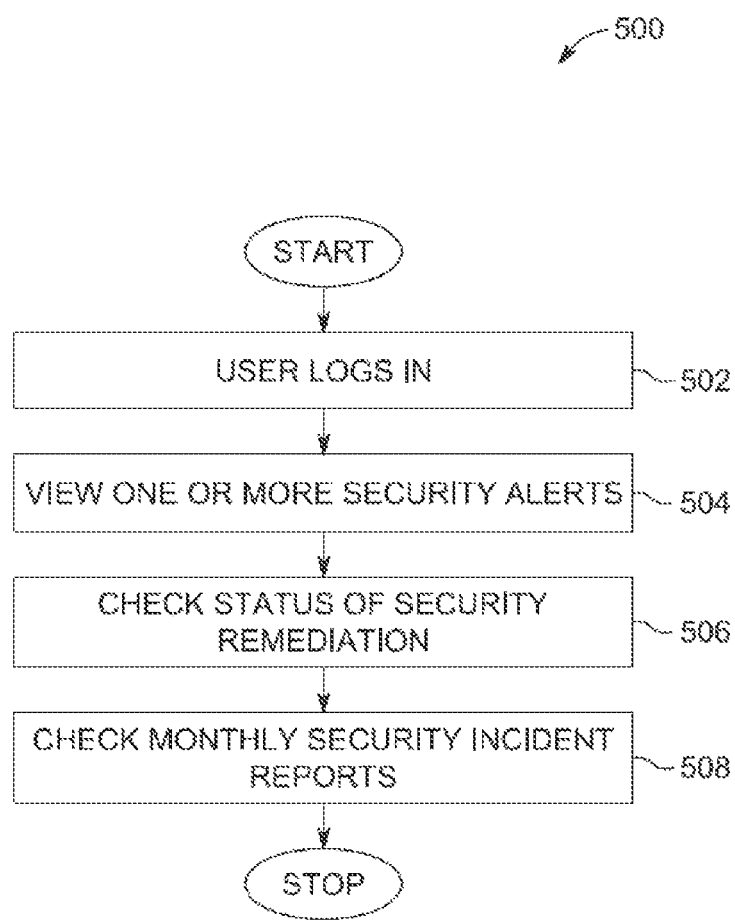
FIG. 5 illustrates a flow chart 500 showing a management user flow, according to an embodiment of the present disclosure.

In one embodiment, the management user flow may be explained in conjunction with a flow chart 500 shown in FIG. 5. It should be noted that the management user (business executive) main concern may be revenue generation, therefore, the management user may understand the cybersecurity in fiduciary terms and compliance officers may be in charge of making sure the security measures are in place align with industry-standard governances. At first, the user may log in to the user portal and control management module 108, at step 502. The user may correspond to a management user 304. Upon successful login, the user may view one or more security alerts, at step 504. The one or more security alerts may include, but is limited to, threats displayed in severity levels. Consequently, the user may check the status of security remediation, at step 506. Additionally, the user may also check a community users' aggregated response as the "Trust Score". The status of the security remediation may include but is not limited to, a resolution status, elapsed time, and user ID of a responsible person. Thereafter, the user may check monthly security incident reports, at step 508.

Figure 6:
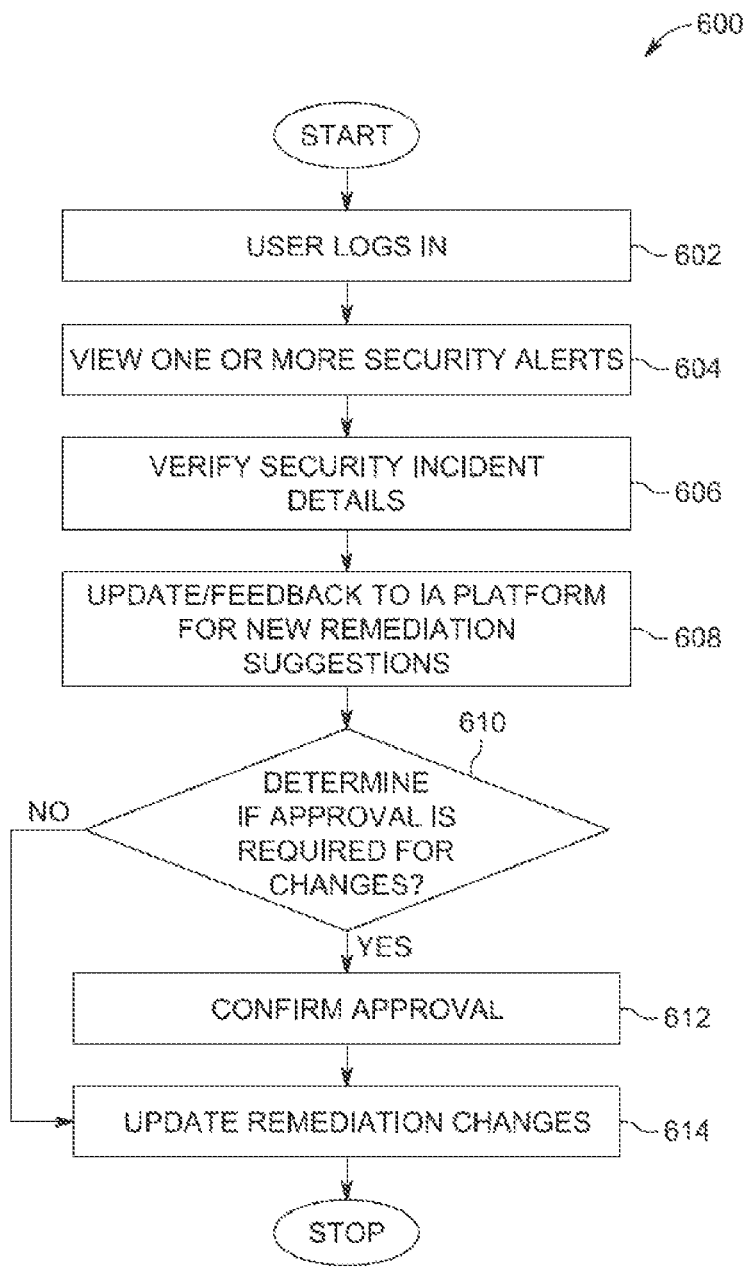
FIG. 6 illustrates a flow chart 600 showing a security analyst flow, according to an embodiment of the present disclosure.

In one embodiment, the security analyst flow may be explained in conjunction with a flow chart 600 shown in FIG. 6. At first, the user may log in to the user portal and control management module 108, at step 602. In one case, the user may correspond to a security analyst (governance team) 306. Upon successful login, the user may view one or more security alerts, at step 604. The one or more security alerts may include, but is limited to, security alerts with severity levels, public CVE and community warnings. Consequently, the user may verify security incident details, at step 606. The security incident details may include but are not limited to, affected device, a user ID associated with the affected device, detected threat, time and other information. Further, based on the verification of security incident details, the user may update and/or provide feedback to the IA platform for new remediation suggestions, at step 608. In one embodiment, an input function may be used to train the iA to increase the accuracy of the option from iA and generate Trust score and Preventive Intelligence. It should be noted that the feedback for the remediation may include tasks required for remediation by the authorized executor. Successfully, the user may determine if an approval is required for changes, at step 610. In one case, if the approval is required, then the user may confirm the approval at step 612 and update remediation changes, at step 614. In another case, if the approval is not required, then the user may move to step 614 to update remediation changes.

Figure 7:
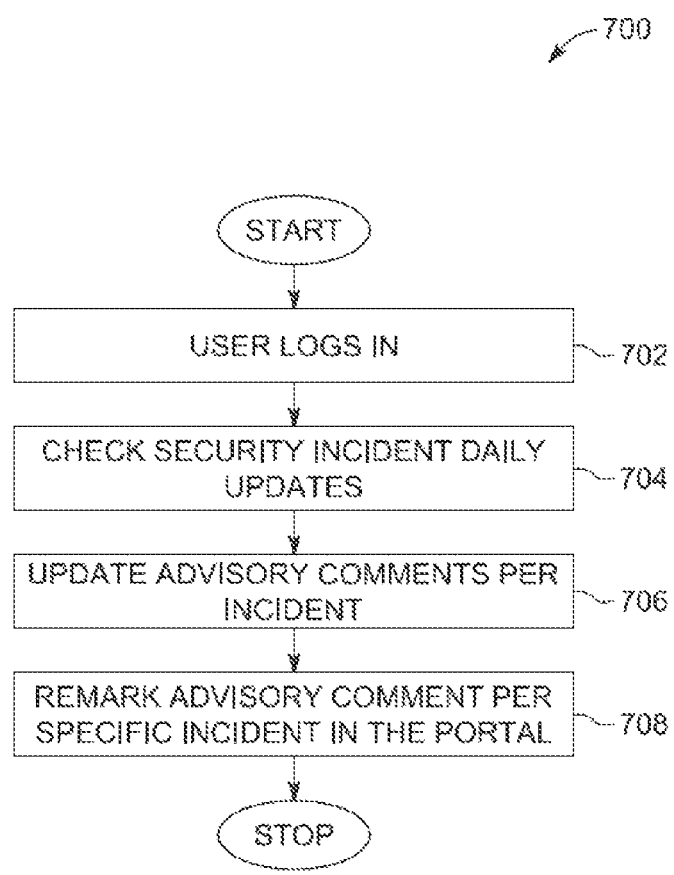
FIG. 7 illustrates a flowchart 700 showing a community user flow, according to an embodiment of the present disclosure.

In one embodiment, the community user flow may be explained in conjunction with a flow chart 700 shown in FIG. 7. At first, the user may log in to the user portal and control management module 108, at step 702. In one embodiment, the user may correspond to a community user 308. Upon successful login, the user may check security incident daily updates, at step 704. It should be noted that the security incident daily updated may include but is not limited to, affected device, user ID, detected threat, time and other information. Consequently, the user may update advisory comments per incident, at step 706. It should be noted that the advisory comments may include remediation suggestion comments along with the user ID of the community user. Thereafter, the user may remark advisory comment per specific incident in the portal, at step 708.

Figure 8:
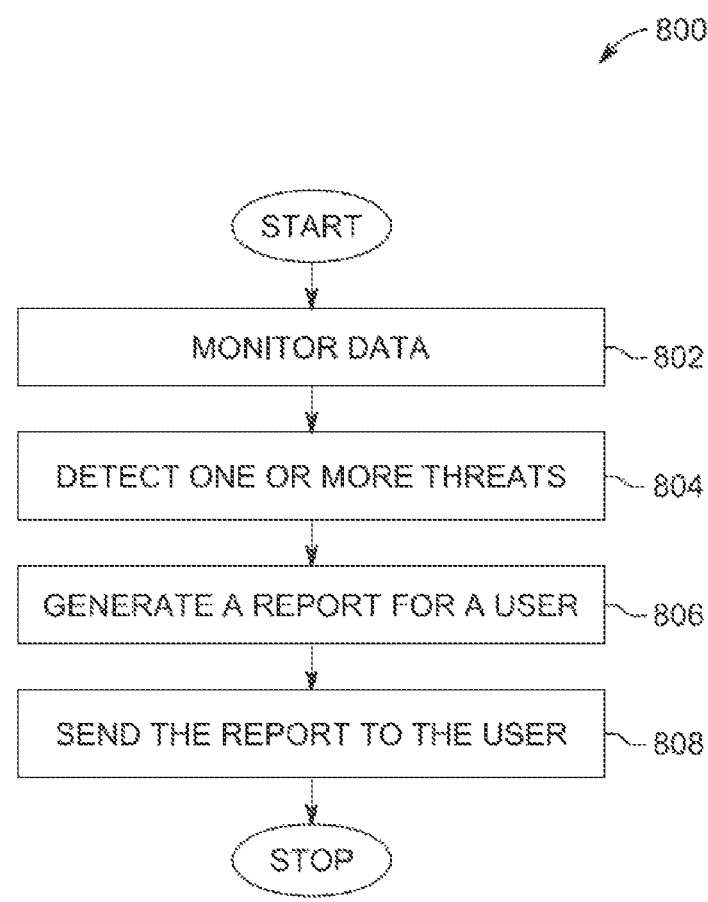
FIG. 8 illustrates a flow chart 800 showing a cyberrisk governance method to automate cybersecurity detection and resolution in a network, according to an embodiment of the present disclosure.

FIG. 8 illustrates a flow chart 800 showing a method for providing autonomous cybersecurity in a network, according to an embodiment of the present disclosure. FIG. 8 comprises a flowchart 800 that is explained in conjunction with the elements disclosed in FIGS. 1, 2, and 3.

The flowchart 800 of FIG. 8 shows the architecture, functionality, and operation relating to a cyberrisk governance method to automate cybersecurity detection and resolution in a network. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 8 may be executed substantially concurrently or the blocks may sometimes be executed in the reverse order, depending upon the functionality involved. Any process descriptions or blocks in flowcharts should be understood as representing modules, segments, or portions of code that include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. Also, the process descriptions or blocks in flow charts should be understood as representing decisions made by a hardware structure such as a state machine. The flowchart 800 starts at step 802 and proceeds to step 808.

At step 802, data related to one or more cybersecurity, Information Technology (IT) operations responses, and governance controls to address regulation, compliance, and enterprise risk, may be monitored. In one embodiment, the data corresponds to unstructured and structured data including at least user device information i.e. user security profile, security patches, historical data, security level, user activities logs from Network Behaviors Analytic (NBA) tools and security information and event management tools (SIEM), Common Vulnerabilities and Exposure (CVE) information from cybersecurity authorities and certified bodies, system details with security patches update records, and the security level selected by the user, in accordance with an embodiment. In one embodiment, the cybersecurity and Information Technology (IT) operations may consist of networking (hardware & software), end-points devices (hardware & software—computer, mobile phone, IoT, security camera, any devices attached to the company network), software applications (customized or off the shelf), network traffic (Source & Destination IP Address, including the "hops" in the telecommunication service providers "bandwidth"), and time (when data is sent & received by the end-point device).

At step 804, one or more threats may be detected in the data using Machine Learning (ML) to learn from cybersecurity, IT, and governance of input and automating the resolution with the correlated and contextualized data. Further, the ML may include, but is not limited to, threat intelligence, governance controls with the input from business executives, compliance managers, internal & external auditors, the Operational Technology (OT) from daily activities with industry-recognized benchmarks, and technical controls assessment results. In one embodiment, the AI threat detection and report generator module 106 may detect the one or more threats such as, but not limited to, a malware detection, an intrusion detection, identified vulnerabilities i.e. common value expose (CVE) and zero-day exploitations, system administration threats i.e. firewall configuration discrepancies and threat intelligence with paid or open-source, a scoring risk in the network for operational technology (OT), fraud detection for IT, and user behavioral analysis for the internet of things (IoT). Further, the AI threat detection and report generator module 106 may correlate the one or more threats as "correlated data" with a scoring risk in the network for OT, prioritization from detection to resolution for IT, with a user and network behavioral analysis to address the "signatureless" risk. It should be noted that the correlated data may be a combination of technology tool integrated into a single platform solution for the user to deploy a series of algorithms based on third-party technology tools to generate the structure and unstructured data from network metadata, devices log, and events for detecting security incidents and governance gap.

It should be noted that one or more threats may be detected after data extraction integration and meeting business requirements process with third-party solution providers. Further, the ecosystem i.e. PEACEcosystem may generate correlated data as part of the ML. It should also be noted that the correlated data may be categorized into three categories including, but not limited to, paid, open-source, and self-generated. In one case, the categorizing of the correlated data may be performed by a global honey pot without departing from the scope of the invention.

At step 806, a report for a user based at least on the detected one or more threats may be generated. The report may include one or more security information and one or more security patches, in accordance with an embodiment. The one or more security patches may be based on one or more remediation recommendations to resolve the security risk. In order to produce remediation recommendations, the AI threat detection and report generator module 106 may combine the correlated data with augmented intelligence working as input via a consolidated risk indicator dashboard for the ML.

At step 808, the report may be sent to the user. The user may include, but is not limited to, the IT administrator 302, the management user 304, the security analyst 306, and the community user 308, in accordance with an embodiment. It should be noted that the community user may also be an OT Operator based on Open-Source and ecosystem solution providers and may provide recommendations to automated fixes based on validated "Trust Score". The automation deployment process may be documented with controls management process within the dashboard, for auditing and training to Operator and ML (augmented intelligence) to continue enhancing the accuracy of ML. The report may facilitate the user with one or more security information and one or more security patches, in accordance with an embodiment. In one additional embodiment, the method may also include receiving, from the user, an input corresponding to a selection of a security patch from the one or more security patches and execution of the selected patch in the network by the user portal and control management module 108 to eliminate the one or more threats. The remediation recommendations may be automatically deployed into the technology tools, i.e. firewall, desktop to resolve the identified vulnerabilities or recommended fixes from the solution providers or community users.

Figure 9A:
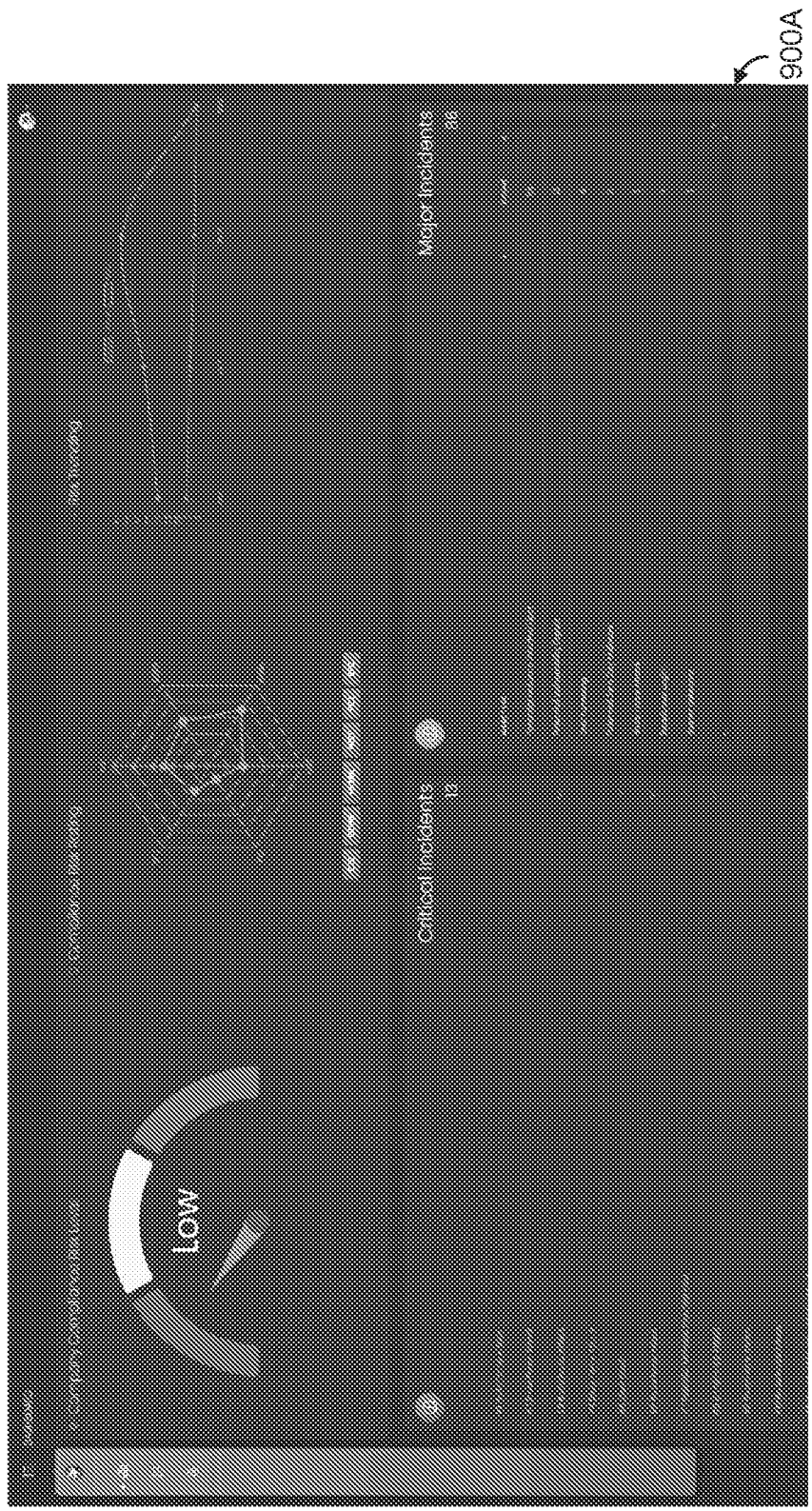
FIG. 9A illustrates a screenshot 900A showing a view of a unity dashboard, according to an embodiment of the present disclosure.

FIG. 9A illustrates a screenshot 900A showing a unity dashboard, according to an embodiment of the present disclosure. In one embodiment, the unity dashboard may be a user interface. The unity dashboard may facilitate a user with information related to company compliance risk level, company compliance rating, risk trending, critical incidents, and major incidents. The company compliance risk level may be categorized into multiple levels, including red, yellow, and green. The compliance risk rating may be described as a spider chart. The trending may be described as a line diagram between major and critical issues. In one embodiment, the unity dashboard may display the number of critical incidents. In another embodiment, the unity dashboard may display the number of major incidents. Further, the unity dashboard may display a count for each of the major incidents.

Figure 9B:
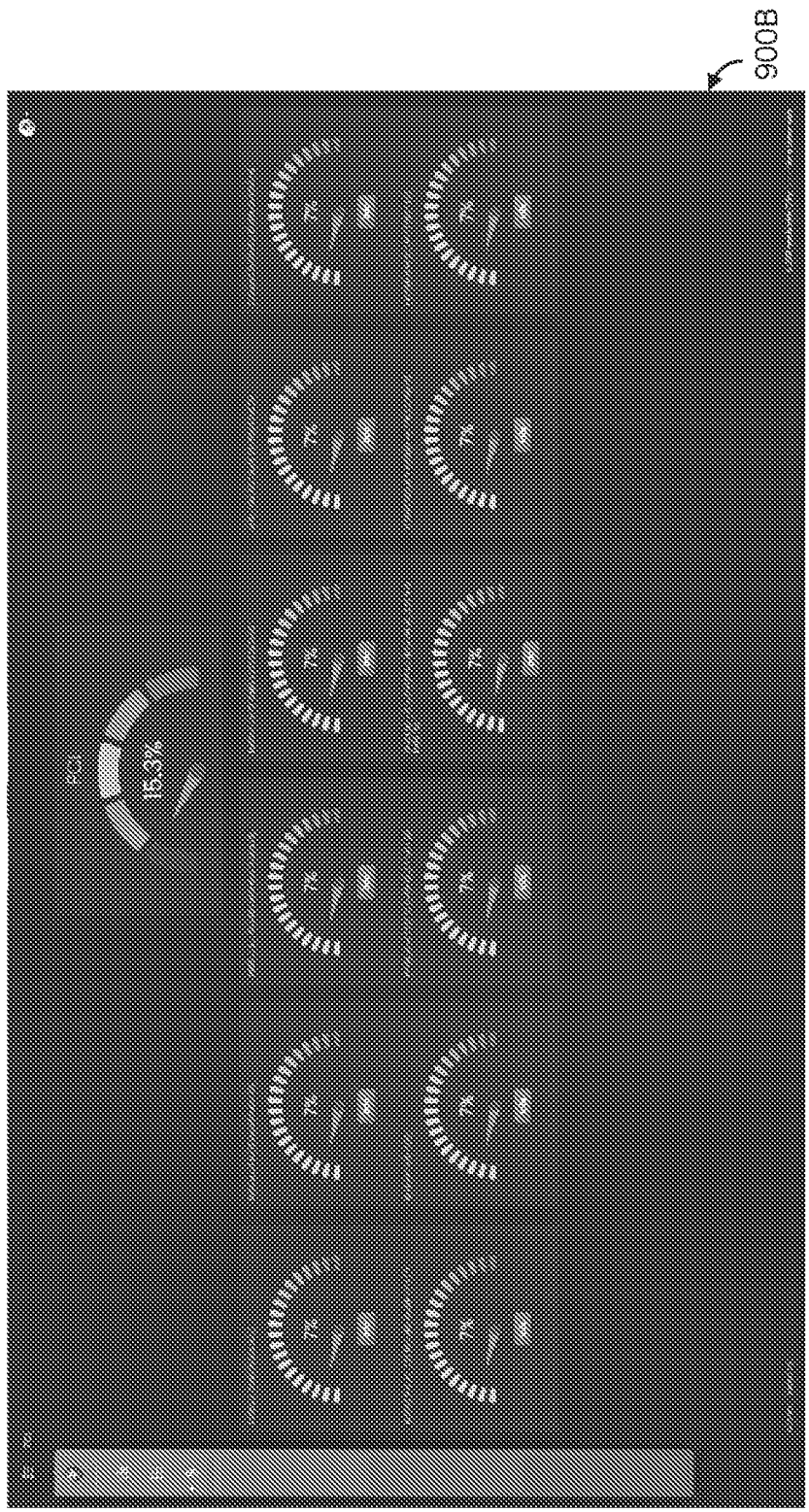
FIG. 9B illustrates a screenshot 900B showing another view of the unity dashboard, according to an embodiment of the present disclosure.

FIG. 9B illustrates a screenshot 900B showing a unity dashboard, according to an embodiment of the present disclosure. The unity dashboard may facilitate a user with information related to Payment Card Industry (PCI), firewall configurations, system defaults management, protecting stored cardholder data, decryption of cardholder data, encryption of cardholder data, anti-virus software or programs, securing systems and applications, ID management, physical access to cardholder data, tracking and monitoring network access and data, testing security and processes, and information security policy.

Figure 9C:
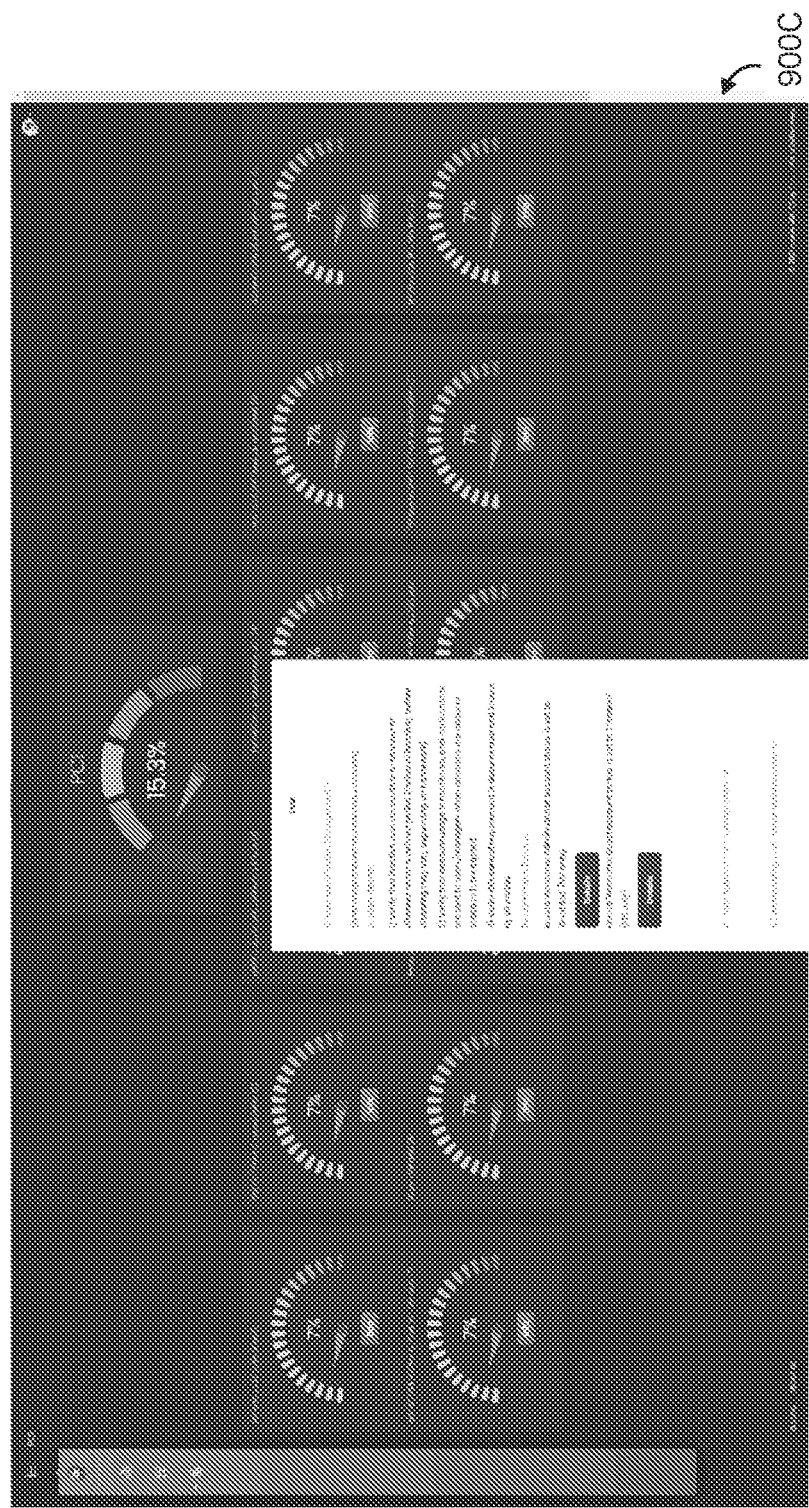
FIG. 9C illustrates a screenshot 900C showing another view of the unity dashboard, according to an embodiment of the present disclosure.

FIG. 9C illustrates a screenshot 900C showing a unity dashboard, according to an embodiment of the present disclosure. The unity dashboard may facilitate a user with detailed information related to at least one of the information displayed in screenshot 900B. In one exemplary embodiment, the unity dashboard may display information related to user ID management. The information may include action items such as verifying that inactive user accounts are removed or disabled within a defined period (period of inactivity before disabling may vary depending on the framework), verifying that an account usage is monitored and notifications are sent to users/managers when accounts are about to expire or have expired.

It will be apparent to one skilled in the art that the above-mentioned system 200 may include a processor (not shown) and a memory (not shown). The processor may perform, based on instructions stored in the memory, to facilitate the operation of a security data management module 104, the AI threat detection and report generator module 106, and the user portal and control management module 108, without departing from the scope of the disclosure.

The disclosed embodiments encompass numerous advantages. Various embodiments of a cyberrisk governance system and method to automate cybersecurity detection and resolution in a network have been disclosed. Such a method allows a user to capture, share and analyze all the network information to find out the latest network behavior related to any new security threats. Further, such a method allows the user to quickly manage and respond to the cybersecurity threat and notify the user with any security alerts as well as provide resolution methods in terms of threat severity level. Such a method for providing autonomous cybersecurity reduces the user's efforts significantly. Such a method facilitates a cost-effective solution with low-cost deployment, an adaptable solution with minimized API development, and a scalable solution with automated processes with AI.

Further, such a system and method to automate cybersecurity detection and resolution in a network addresses the business executives, the governance team, and the technology team allowing them to work towards the common goal of cybersecurity. Such a system and method utilizes a technology platform that encourages communication among executives, governance auditors, and technologists by providing a visual dashboard to collectively operate and assess risk management. Further, such a system and method eliminates guesswork with interoperability, data visualization, and integration within the platform to offer all the stakeholders a transparent process and solution to mitigate enterprise risk. Such a system and method further facilitate another layer of security and control using the Blockchain technology i.e. Distributed Ledger Technology (DLT).

Such a system and method to automate cybersecurity detection and resolution in a network enables autonomous cybersecurity with reinforced Machine Learning (ML) to collaborate human capital expertise and AI to prevent cyberattack and governance risk. Further, disclosed system and method to automate cybersecurity detection and resolution in a network encourages communication with visibility of risk indicator among the business executive, governance auditor, and technologist to collaborate and prioritize optimal remediation resolution in the most cost-efficient and highest accuracy rate from the ecosystem. Further, the disclosed system and method to automate cybersecurity detection and resolution in a network comprises an open-source community and correlates with the company expertise and decision-makers. Further, such a system and method to automate cybersecurity detection and resolution in a network include the trust score, a vetted solution, and an ecosystem's Preventive Intelligence (PI) to eliminate guest work with cyberrisk Governance interoperability, data visualization, & integration to operate in a platform offering all the stakeholders a transparent process solution to mitigate the enterprise risk.

Such a system and method to automate cybersecurity detection and resolution in a network to address the enterprise risks from areas including business risk associates with regulations and data breaches, such as penalties, reputational loss, productivity loss, etc. Further, such a system and method solve regulatory and compliance risk affecting business operation rights and model, leading to a loss of licensing and penalties. Further, disclosed system and method solves the cybersecurity and IT management risk in managing and operating information technologies that may lead to failure in regulations, business operations and reputational loss. Further, the disclosed system and method may provide control management solutions to prioritize and control risk, authorize and assign tasks, audit trail for accountability, and manage vendor solutions through the patch management solutions via an application programming interface (API).

Such a system and method to automate cybersecurity detection and resolution in a network predict the risk level of a particular community user or clients based on a certain type of IT solutions. Further, the system enables the development of a consolidated risk indicator with controls management metrics in an ecosystem integrated with the platform of autonomous cybersecurity solutions. Furthermore, the system combines socio-technical system with human expertise, entity objectives, and IoT to analyze comprehensively with the InterOps Accelerator (iA) Machines Learning to enable efficiency in cyberrisk detection, resolution, prevention and recovery against the AAAA threats. It should be noted that the AAAA threats may include all known human and institutional harms, commerce "weaponization" such as information arbitrage, competitive advantage, surveillance capitalism, government "weaponization" such as an attack on populations, institutions, critical infrastructure, civil society "weaponization" such as fraud, undue advantage, extortion, misinformation, accidents such as unintentional acts of individuals and institutions, unreasonable ignorance i.e. negligence, an act of nature, disease, weather, solar activity, tectonic activity, floods, AI/autonomous systems, etc. The system may utilize a tool such as Atlas for analyzing and mitigating AAAA threats.

Such a system and method to automate cybersecurity detection and resolution in a network greatly reduce the efforts of an analyst with little tradeoff security by reducing the number of issues to be handled. Further, such a system and method prioritizes alerts and CVEs that are processed and organized in order to train a model accurately and easily. Further, such a system and method allows addressing and fixing misclassification by facilitating the analyst to give feedback to the AI model.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except in so far as indicated by the scope of the appended claims.

What is claimed is:

1. A cyberrisk governance method to automate cybersecurity detection and provide resolution in a network, the method comprising:
    monitoring data related to one or more cybersecurity, Information Technology (IT) operation responses, and governance controls to address regulation, compliance, and enterprise risk;
    detecting one or more threats in the data using Machine Learning (ML), wherein the one or more threats correspond to at least a malware detection, an intrusion detection, identified vulnerabilities, system administration threats, a scoring risk in the network for operational technology (OT), fraud detection for IT, and user behavioral analysis for the internet of things (IoT);
    generating a report, for a user, based at least on the detected one or more threats, wherein the generated report includes one or more security information and one or more security patches;
    sending the report to the user, thereby automating cybersecurity detection and resolution in the network;
    receiving, from the user, an input corresponding to a selection of a security patch from the one or more security patches; and
    executing the selected security patch in the network to eliminate the one or more threats.

2. The method of claim 1, further comprising consolidating the data and storing the consolidated data in a database.

3. The method of claim 2, wherein the database has an additional layer of security with tokenization for users to control the consolidated data utilizing Distributed Ledger Technology (DLT).

4. The method of claim 2, wherein the consolidated data is integrated and classified into GraphQL using a blockchain technology.

5. The method of claim 1, wherein the data corresponds to unstructured and structured data, the unstructured and structured data including at least user device information, and wherein the user device information includes at least one of user security profile, security patches, historical data, security level, user activity logs, security information, or Common Vulnerabilities and Exposure (CVE) information.

6. The method of claim 1, wherein the one or more security information includes at least one or more security alerts for malicious attacks, Common Vulnerabilities and Exposure (CVE) information, and cybersecurity authorities.

7. The method of claim 1, wherein the ML is trained based at least on historical data and one or more feedbacks from the users.

8. A cyberrisk governance system to automate cybersecurity detection and resolution in a network, the system comprising:
    a security data management module configured to monitor data related to one or more cybersecurity, Information Technology (IT) operation responses, and governance controls to address regulation, compliance and enterprise risk;
    an artificial threat detection and report generator module configured to detect one or more threats in the data using Machine Learning (ML), wherein the one or more threats correspond to at least a malware detection, an intrusion detection, a scoring risk in the network for operational technology (OT), fraud detection for IT, and user behavioral analysis for the internet of things (IoT); and
    a user portal and control management module configured to:
        generate a report, for a user, based at least on the detected one or more threats, wherein the generated report includes one or more security information and one or more security patches;
        send the report to the user, thereby automating cybersecurity detection and resolution in the network;
        receive, from the user, an input corresponding to a selection of a security patch from the one or more security patches; and
        execute the selected security patch in the network to eliminate the one or more threats.

9. The system of claim 8, wherein the data is consolidated and stored in a database.

10. The system of claim 9, wherein the database has an additional layer of security with tokenization for users to control the consolidated data utilizing Distributed Ledger Technology (DLT).

11. The system of claim 9, wherein the consolidated data is integrated and classified into GraphQL using a blockchain technology.

12. The system of claim 8, wherein the ML is trained based at least on historical data and one or more feedbacks from the users.

13. A non-transitory computer program product to automate cybersecurity detection and resolution in a network, the computer program product comprising program code to:

monitor data related to one or more cybersecurity and Information Technology (IT) operation responses, and governance controls to address regulation, compliance, and enterprise risk;

detect one or more threats in the data using Machine Learning (ML), wherein the one or more threats correspond to at least a malware detection, an intrusion detection, a scoring risk in the network for operational technology (OT), fraud detection for IT, and user behavioral analysis for the internet of things (IoT);

generate a report for a user based at least on the detected one or more threats, wherein the generated report includes one or more security information and one or more security patches;

send the report to the user, thereby automating cybersecurity detection and resolution in the network;

receive, from the user, an input corresponding to a selection of a security patch from the one or more security patches; and execute the selected security patch in the network to eliminate the one or more threats.

14. The computer program product of claim 13, comprising the program code to consolidate the data and store the consolidated data in a database.

15. The computer program product of claim 14, wherein the database has an additional layer of security with tokenization for users to control the consolidated data utilizing Distributed Ledger Technology (DLT).

16. The computer program product of claim 14, wherein the consolidated data is integrated and classified into GraphQL using a blockchain technology.

17. The computer program product of claim 13, wherein the ML is trained based at least on historical data and one or more feedbacks from the users.

* * * * *